US010207673B2

(12) United States Patent
Uchibori et al.

(10) Patent No.: US 10,207,673 B2
(45) Date of Patent: Feb. 19, 2019

(54) SEAT BELT RETRACTOR AND SEAT BELT DEVICE

(71) Applicant: JOYSON SAFETY SYSTEMS JAPAN K.K., Tokyo (JP)

(72) Inventors: Hayato Uchibori, Tokyo (JP); Daichi Nemoto, Tokyo (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 140 days.

(21) Appl. No.: 15/316,747

(22) PCT Filed: May 26, 2015

(86) PCT No.: PCT/JP2015/064993
§ 371 (c)(1),
(2) Date: Dec. 6, 2016

(87) PCT Pub. No.: WO2015/190279
PCT Pub. Date: Dec. 17, 2015

(65) Prior Publication Data
US 2017/0240135 A1    Aug. 24, 2017

(30) Foreign Application Priority Data
Jun. 10, 2014    (JP) ................... 2014-119912

(51) Int. Cl.
*B60R 22/28*    (2006.01)
*B60R 22/36*    (2006.01)
(Continued)

(52) U.S. Cl.
CPC .......... *B60R 22/28* (2013.01); *B60R 22/3413* (2013.01); *B60R 22/36* (2013.01);
(Continued)

(58) Field of Classification Search
CPC ......... B60R 22/26; B60R 22/28; B60R 22/36; B60R 22/1855; B60R 22/1954; B60R 22/3413
See application file for complete search history.

(56) References Cited

U.S. PATENT DOCUMENTS 6,216,972 B1 * 4/2001 Rohrle ................ B60R 22/3413
                                                     242/379.1
6,250,684 B1 * 6/2001 Gleason .................. B60R 22/24
                                                          24/197
(Continued)

FOREIGN PATENT DOCUMENTS

DE    10 2009 010 435 A1    9/2010
DE    10 2008 049 931 B4    3/2012
(Continued)

OTHER PUBLICATIONS

International Search Report issued in International Patent Application No. PCT/JP2015/064993 dated Jul. 7, 2015.
(Continued)

*Primary Examiner* — Sang K Kim
(74) *Attorney, Agent, or Firm* — Foley & Lardner LLP (57) ABSTRACT

Provided are a seat belt retractor and a seat belt device with which it is possible to improve an occupant-restraining property and energy absorption characteristics. A seat belt retractor 1 including a spool 2 that winds up a webbing W for restraining an occupant, a shaft 3 inserted through an axial center of the spool 2, and a locking base 4 connected to the shaft 3 and capable of switching between a rotating state and a non-rotating state, further includes an energy absorption device 5 capable of changing an energy absorption amount according to a relative rotation speed between the spool 2 and the shaft 3, and a load adjustment member 6 that blocks or reduces load transmission when a load equal to or greater than a threshold is applied to the shaft 3 or the
(Continued)

spool 2. The spool 2, the shaft 3, the locking base 4, the energy absorption device 5, and the load adjustment member 6 are serially connected.

4 Claims, 8 Drawing Sheets

(51) Int. Cl.
  *B60R 22/34* (2006.01)
  *B60R 22/44* (2006.01)
  *B60R 22/46* (2006.01)

(52) U.S. Cl.
  CPC .......... *B60R 22/44* (2013.01); *B60R 22/4676* (2013.01); *B60R 2022/287* (2013.01); *B60R 2022/289* (2013.01)

(56) References Cited

U.S. PATENT DOCUMENTS

| | | | |
|---|---|---|---|
| 6,416,008 B1 * | 7/2002 | Fujii | B60R 22/4676 242/379.1 |
| 7,232,089 B2 * | 6/2007 | Inagawa | B60R 22/3413 242/379.1 |
| 8,262,059 B2 | 9/2012 | Dolenti et al. | |
| 8,473,162 B2 | 6/2013 | Jabusch | |
| 8,523,140 B2 | 9/2013 | Dolenti et al. | |
| 8,529,398 B2 | 9/2013 | Jabusch | |
| 9,242,617 B2 | 1/2016 | Singer et al. | |
| 9,327,681 B2 | 5/2016 | Singer et al. | |
| 2005/0133330 A1 | 6/2005 | Stiefvater | |
| 2013/0140390 A1 | 6/2013 | Stroik, Jr. | |
| 2013/0140391 A1 | 6/2013 | Jabusch | |
| 2015/0203070 A1 | 7/2015 | Singer et al. | |

FOREIGN PATENT DOCUMENTS

| | | |
|---|---|---|
| DE | 10 2011 008 405 A1 | 7/2012 |
| DE | 10 2011 101 481 A1 | 11/2012 |
| DE | 10 2011 101 517 A1 | 11/2012 |
| DE | 10 2011 101 518 A1 | 11/2012 |
| DE | 10 2011 114 572 A1 | 4/2013 |
| DE | 10 2011 101 516 B4 | 7/2013 |
| DE | 10 2012 010 918 A1 | 12/2013 |
| DE | 10 2010 026 285 B4 | 2/2014 |
| DE | 10 2010 050 189 B4 | 3/2014 |
| DE | 10 2012 214 521 B4 | 3/2014 |
| DE | 10 2013 001 375 A1 | 7/2014 |
| DE | 10 2011 089 203 B4 | 8/2014 |
| DE | 10 2011 101 515 B4 | 8/2014 |
| DE | 10 2013 203 286 A1 | 8/2014 |
| DE | 10 2014 202 498 B3 | 3/2015 |
| DE | 10 2013 220 949 A1 | 4/2015 |
| EP | 1 874 593 B1 | 12/2010 |
| JP | 2001-287621 A | 10/2001 |
| JP | 2006-159982 A | 6/2006 |
| JP | 2009-113551 A | 5/2009 |
| JP | 2012-030636 A | 2/2012 |
| JP | 2013-184538 A | 9/2013 |
| JP | 2014-502576 A | 2/2014 |
| JP | 2015-128925 A | 7/2015 |
| WO | WO-2004/096611 A1 | 11/2004 |
| WO | WO-2007/130041 A1 | 11/2007 |
| WO | WO-2010/139433 A1 | 12/2010 |
| WO | WO-2012/014380 A1 | 2/2012 |
| WO | WO-2012/059166 A1 | 5/2012 |
| WO | WO-2012/156019 A1 | 11/2012 |
| WO | WO-2012/156020 A1 | 11/2012 |
| WO | WO-2013/074975 A1 | 5/2013 |
| WO | WO-2013/079150 A1 | 6/2013 |
| WO | WO-2014/131824 A1 | 9/2014 |
| WO | WO-2015/055570 A1 | 4/2015 |
| WO | WO-2015/121159 A1 | 8/2015 |

OTHER PUBLICATIONS

European Search Report and Written Opinion dated Dec. 11, 2017 in corresponding application No. 15807112.

* cited by examiner

SEAT BELT RETRACTOR AND SEAT BELT DEVICE

CROSS-REFERENCE TO RELATED APPLICATIONS

The present application is a U.S. stage application of International Patent Application No. PCT/JP2015/064993, filed May 26, 2015, which claims the benefit of priority to Japanese Patent Application No. 2014-119912, filed Jun. 10, 2014, the entireties of which are hereby incorporated by reference.

TECHNICAL FIELD

The present invention relates to a seat belt retractor and a seat belt device, and more specifically, to a seat belt retractor suitable for improving energy absorption performance and a seat belt device provided with the seat belt retractor.

BACKGROUND ART

For example, in a winding device of a long object having a belt shape or a string shape (including a rewinding function), a winding barrel (also referred to as a drum or a spool) around which the long object is wound performs a rotary motion relative to a supporting unit rotatably supporting the winding barrel. In the device that performs such relative motion, in a case where the long object is fully extended or where the winding barrel is stopped during winding or rewinding, a large load is applied to the device and to the long object, whereby it is preferred that an energy absorption device be disposed between objects that are performing the relative motion. A representative example of such winding device is a seat belt retractor used in a seat belt device (see, for example, Patent Literature 1 or 2).

Patent Literature 1 discloses a seat belt retractor having a torsion bar and a wire disposed between a winding drum and a ratchet gear, which rotate relative to each other. By using such seat belt retractor, it is possible to absorb energy that may be generated between the winding drum and the ratchet gear by torsional deformation of the torsion bar and sliding deformation of the wire, and it is also possible to change energy absorption characteristics by varying a drawing load required for causing the sliding deformation of the wire.

Patent Literature 2 discloses a force-limiting device for a motor vehicle having ring disks (1 and 3) and an oscillating part (2) disposed between objects rotating relative to each other. By using such device, when the oscillating part (2) rotates relative to the ring disks (1 and 3), a protrusion (5) formed in the oscillating part (2) alternately contacts protrusions (7 and 8) formed in the ring disks (1 and 3) while oscillating, whereby it is possible to absorb energy generated between the objects rotating relative to each other. More specifically, in this device, kinetic energy changes with a rotation speed of the oscillating part (2), whereby it is possible to increase an energy absorption amount as the rotation speed of the oscillating part (2) increases.

CITATION LIST

Patent Literature

Patent Literature 1: JP 2013-184538 A
Patent Literature 2: JP 2014-502576 A

SUMMARY OF INVENTION

Technical Problem

In the seat belt device having the seat belt retractor provided with the energy absorption device as described above in Patent Literatures 1 and 2, occupants of various physical constitutions such as a male, a female, a large person, and a small person may sit on a seat of the same vehicle. Thus, a load applied to a webbing and a retractor at a time of a vehicle crash may vary for the same seat belt device.

To deal with this varying load, it is necessary to dispose, to a vehicle, a sensor for determining the physical constitution of the occupant or an energy absorption device capable of handling different loads. Note, however, that such phenomenon is not limited to the seatbelt retractor and may also occur, for example, to a winding device that winds a long object of a different thickness or a different type (fabric, deck, etc.).

With the energy absorption device described in Patent Literature 1, however, it is possible to change the energy absorption characteristic in two steps by the wire and the torsion bar, but it is not possible to change the energy absorption characteristic steplessly.

With the energy absorption device described in Patent Literature 2, it is possible to change an energy absorption amount according to a rotation speed of the oscillating part, whereby it is possible to deal with the occupants of various physical constitutions. Since there is no upper limit set, however, an occupant-restraining property may be reduced even though it is capable of continuously absorbing the energy.

The present invention has been made in view of such problem, and an objective thereof is to provide a seat belt retractor and a seat belt device with which it is possible to improve the occupant-restraining property as well as to improve the energy absorption characteristic.

Solution to Problem

According to the present invention, there is provided a seat belt retractor including a spool that performs winding of a webbing for restraining an occupant, a shaft inserted through an axial center of the spool, and a locking base connected to the shaft and capable of switching between a rotating state and a non-rotating state. The seat belt retractor also includes an energy absorption device capable of changing an energy absorption amount according to a relative rotation speed between the spool and the shaft, and a load adjustment member that blocks or reduces load transmission in a case where a load equal to or greater than a threshold is applied to the shaft or the spool. The spool, the shaft, the locking base, the energy absorption device, and the load adjustment member are serially connected.

According to the present invention, there is provided a seat belt device including a webbing for restraining an occupant to a seat, a seat belt retractor that performs winding of the webbing, a belt anchor that fixes the webbing to a vehicle body side, a buckle disposed to a lateral face of the seat, and a tongue disposed to the webbing. The seat belt retractor includes a spool that performs winding of the webbing, a shaft inserted through an axial center of the spool, and a locking base connected to the shaft and capable of switching between a rotating state and a non-rotating state. The seat belt retractor also includes an energy absorption device capable of changing an energy absorption amount according to a relative rotation speed between the spool and the shaft, and a load adjustment member that blocks or reduces load transmission in a case where a load equal to or greater than a threshold is applied to the shaft or the spool. The spool, the shaft, the locking base, the energy absorption device, and the load adjustment member are serially connected.

In the seat belt retractor and the seat belt device, the energy absorption device may be disposed between the spool and the shaft.

The load adjustment member is disposed between the locking base and the shaft, between the shaft and the energy absorption device, or between the energy absorption device and the spool, for example.

The energy absorption device may include a housing coaxially disposed on a spool side, a clutch plate coaxially disposed on a shaft side, and a drag generation member housed inside the housing and that generates drag according to the relative rotation speed between the housing and the clutch plate.

The load adjustment member may be any of a load limiter, a torque limiter, a torsion bar integrally formed with the shaft, and an energy absorption member.

Advantageous Effects of Invention

In the seat belt retractor and the seat belt device according to the above-described present invention, by serially connecting the shaft, the locking base, the energy absorption device, and the load adjustment member, in a case where the relative rotation speed is generated between the spool and the shaft, it is possible to vary the energy absorption amount steplessly according to the relative rotation speed by the energy absorption device, and in a case where the load equal to or greater than the threshold is applied to the shaft or the spool, it is possible to absorb or limit the load applied to the seat belt retractor by the load adjustment member. Thus, the energy absorption device and the load adjustment member may be operated in steps, whereby it is possible to improve the occupant-restraining property as well as to improve the energy absorption characteristic.

BRIEF DESCRIPTION OF DRAWINGS

FIGS. 1(A) to 1(C) are conceptual diagrams illustrating a seat belt retractor according to a first embodiment of the present invention.

FIGS. 2(A) and 2(B) are graphs illustrating an effect of the embodiment illustrated in FIGS. 1(A) to 1(C)

DESCRIPTION OF EMBODIMENTS

Figure 1A:
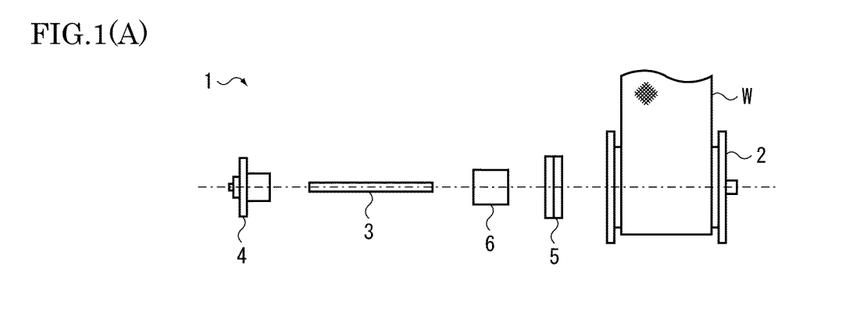
FIG. 1(A) is the diagram illustrating a first example.
Figure 1B:
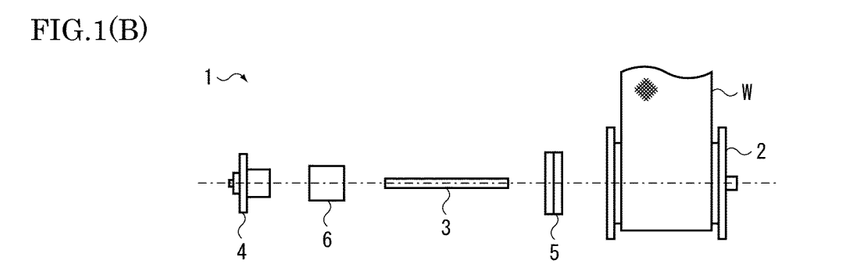
FIG. 1(B) is the diagram illustrating a second example.
Figure 1C:
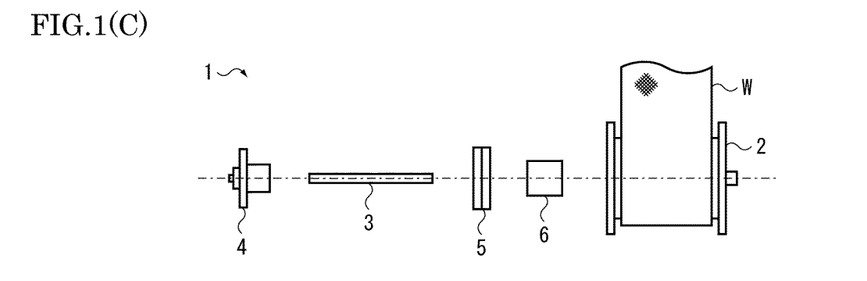
FIG. 1(C) is the diagram illustrating a third example.
Figure 2A:
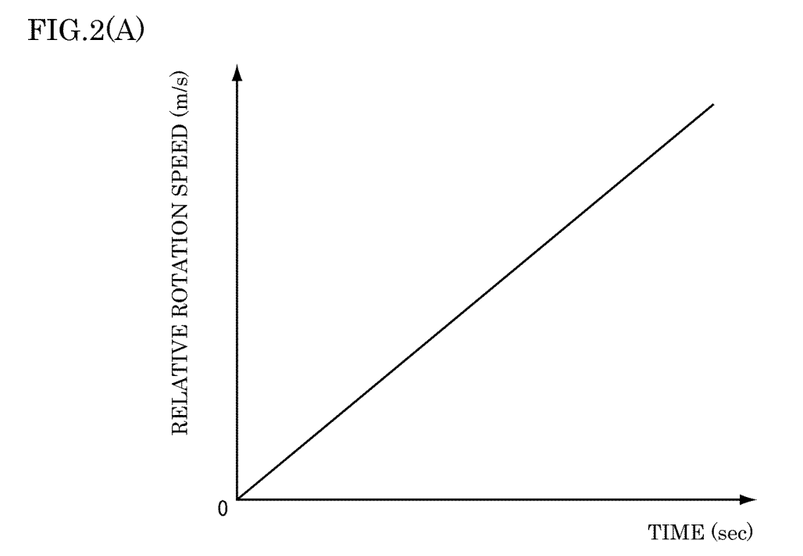
FIG. 2(A) is the graph illustrating a time course of a relative rotation speed.
Figure 2B:
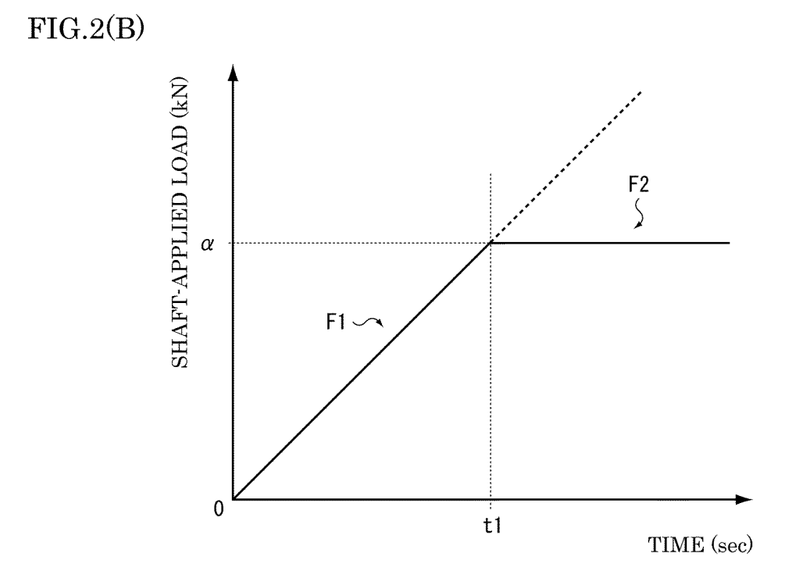
FIG. 2(B) is the graph illustrating a time course of a shaft-applied load.

Hereinafter, embodiments of the present invention are described by using FIGS. 1(A) to 8. Here, FIGS. 1(A) to 1(C) are conceptual diagrams illustrating a seat belt retractor according to a first embodiment of the present invention; FIG. 1(A) is the diagram illustrating a first example, FIG. 1(B) is the diagram illustrating a second example, and FIG. 1(C) is the diagram illustrating a third example. FIGS. 2(A) and 2(B) are graphs illustrating an effect of the embodiment illustrated in FIGS. 1(A) to 1(C); FIG. 2(A) is the graph illustrating a time course of a relative rotation speed, FIG. 2(B) is the graph illustrating a time course of a shaft-applied load.

A seat belt retractor 1 according to the first embodiment of the present invention includes, for example, as illustrated in FIGS. 1(A) to 1(C), a spool 2 that performs winding of a webbing W for restraining an occupant, a shaft 3 inserted through an axial center of the spool 2, and a locking base 4 connected to the shaft 3 and capable of switching between a rotating state and a non-rotating state. The seat belt retractor 1 also includes an energy absorption device 5 capable of changing an energy absorption amount according to a relative rotation speed between the spool 2 and the shaft 3, and a load adjustment member 6 that blocks or reduces load transmission in a case where a load equal to or greater than a threshold is applied to the shaft 3 or the spool 2. The spool 2, the shaft 3, the locking base 4, the energy absorption device 5, and the load adjustment member 6 are serially connected. Note that a specific structure of each constituent component is described below.

The seat belt retractor 1 includes, in general, a base frame that rotatably houses the spool 2 and the shaft 3. A part of the shaft 3 is connected to the locking base 4, and another part of the shaft 3 is connected to the spool 2 through the energy absorption device 5. It is configured such that the locking base 4 is capable of performing a rotary motion in synchronization with the shaft 3 during the normal time. It is also configured such that in a case where a sudden deceleration is caused to a vehicle or where a drawing-out speed of the webbing W exceeds a threshold, for example, the locking base 4 is capable of putting the shaft 3 into the non-rotating state by restricting the rotary motion by a restraining unit such as an acceleration sensor or a locking mechanism.

During the normal time in which the locking base 4 is in an unrestrained state (i.e., rotating state), a relative rotary motion is not generated between the spool 2 and the shaft 3, whereby energy of torque of the spool 2 (shaft 3) is not absorbed by the shaft 3 (spool 2) through the energy absorption device 5 but is transmitted. In contrast, during a non-rotating time in which the locking base 4 is in a restraining state, the relative rotary motion is generated between the spool 2 and the shaft 3, whereby the energy absorption device 5 is operated when the relative rotation speed exceeds a predetermined threshold, and kinetic energy that has been generated by the relative rotary motion is absorbed. At this time, it is preferred that the energy absorption device 5 be capable of changing the energy absorption amount according to the relative rotation speed such that the energy absorption amount is small in a case where the relative rotation speed is low and the energy absorption amount is large in a case where the relative rotation speed is high.

As described above, the locking base 4, the shaft 3, the energy absorption device 5, and the spool 2 are serially connected in this order. Furthermore, as illustrated in FIGS. 1(A) to 1(C), the load adjustment member 6 is serially disposed between these components in this embodiment. Here, "serially" means that a power transmission path is serial. In the first example illustrated in FIG. 1(A), the load adjustment member 6 is disposed between the shaft 3 and the energy absorption device 5. In the second example illustrated in FIG. 1(B), the load adjustment member 6 is disposed between the locking base 4 and the shaft 3. In the third example illustrated in FIG. 1(C), the load adjustment member 6 is disposed between the energy absorption device 5 and the spool 2.

The load adjustment member 6 is a component that, in a case where a load exceeding a predetermined threshold is generated between two objects and an overload exists, cuts or moderates a link between the two objects and blocks or reduces the load transmission. The load adjustment member 6 is, for example, a load limiter or a torque limiter. The load limiter or the torque limiter of various forms available on the market may be arbitrary selected for use.

The load adjustment member 6 may also be a torsion bar integrally formed with the shaft 3. By integrally forming the shaft 3 with the load adjustment member 6, it is possible to reduce the number of components. It is especially effective to apply the torsion bar to the first example illustrated in FIG. 1(A). The load adjustment member 6 may also be an energy absorption member such as an energy absorption plate and an energy absorption wire used in a conventional retractor. Such energy absorption member reduces the load transmission between the two objects through plastic deformation of the plate, the wire, and the like.

Here, an effect of serially connecting the spool 2, the shaft 3, the locking base 4, the energy absorption device 5, and the load adjustment member 6 is described with reference to FIGS. 2(A) and 2(B). FIG. 2(A) is the graph illustrating a change in the relative rotation speed generated between the spool 2 and the shaft 3, in which a horizontal axis represents time (sec) and a vertical axis represents the relative rotation speed (m/s). FIG. 2(B) is the graph illustrating a change in the shaft-applied load, and a horizontal axis represents time (sec) and a vertical axis represents the shaft-applied load (kN). Note that a torque limiter is used as the load adjustment member 6.

Now, as illustrated in FIG. 2 (A), relative rotation is generated between the spool 2 and the shaft 3 at a time t=0, and the relative rotation speed increases by a linear function with a lapse of the time. By a start of the relative rotary motion, the energy absorption device 5 operates, and as indicated by F1 in FIG. 2(B), the shaft-applied load increases with the lapse of the time while energy thereof is absorbed. Then, when the load applied to the shaft 3 reaches a threshhold α causing an overloaded state, the load adjustment member 6 operates, and as indicated by F2 in FIG. 2(B), the load transmission equal to or greater than the threshhold α between the spool 2 and the shaft 3 is blocked. Note that the vertical axis in FIG. 2(B) may also be a spool-applied load that is applied to the spool 2.

According to this embodiment, as illustrated in FIG. 2(B), in a case where the relative rotation speed is generated between the spool 2 and the shaft 3, it is possible to vary the energy absorption amount steplessly according to the relative rotation speed. In a case where the load equal to or greater than the threshhold α is applied to the shaft 3 or the spool 2, it is possible to absorb or limit the load applied to the seat belt retractor 1 by the load adjustment member 6. Thus, the energy absorption device 5 and the load adjustment member 6 may be operated in steps, whereby it is possible to improve an occupant-restraining property as well as to improve an energy absorption characteristic.

Figure 3:
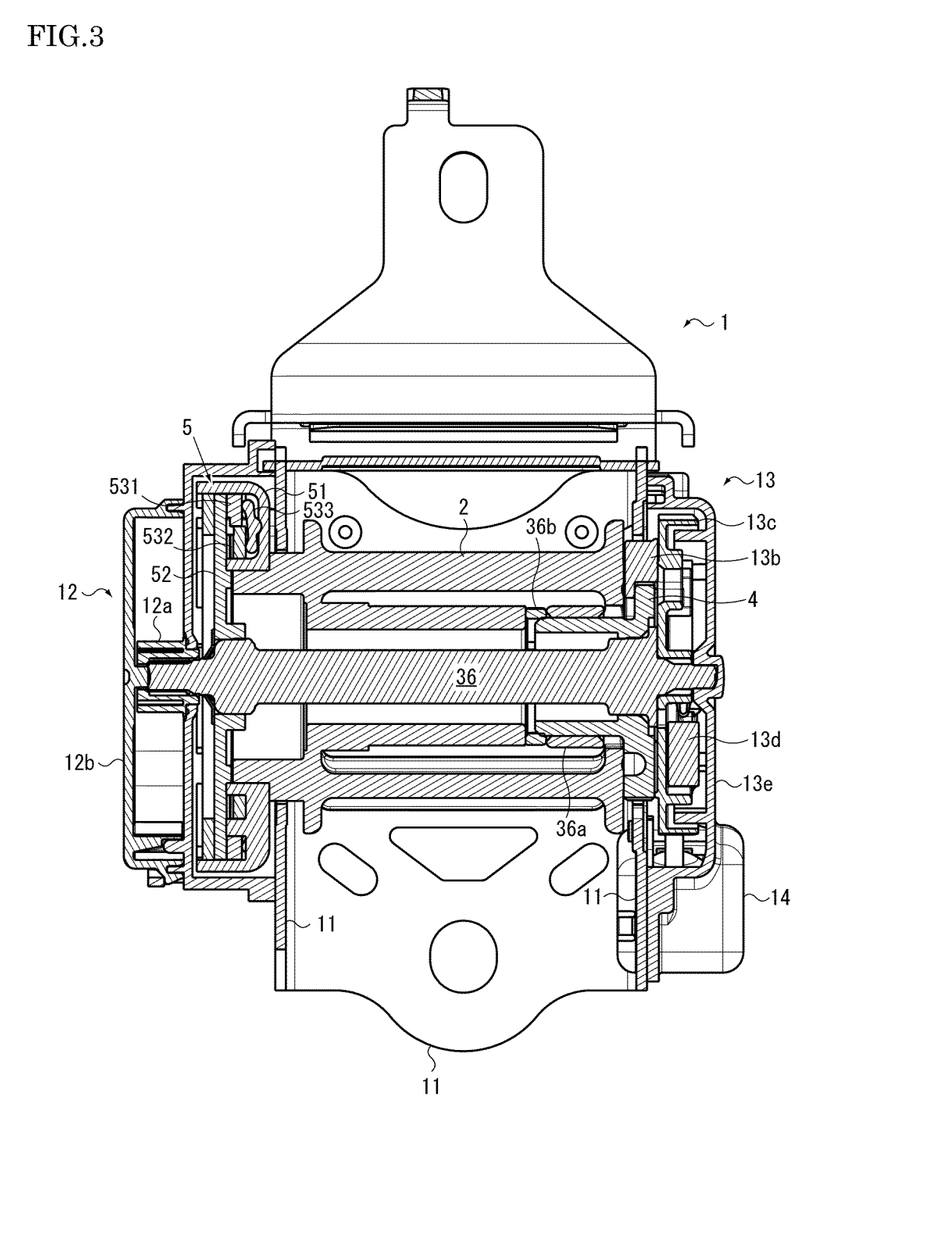
FIG. 3 is a sectional view illustrating a seat belt retractor according to a second embodiment of the present invention.
Figure 4:
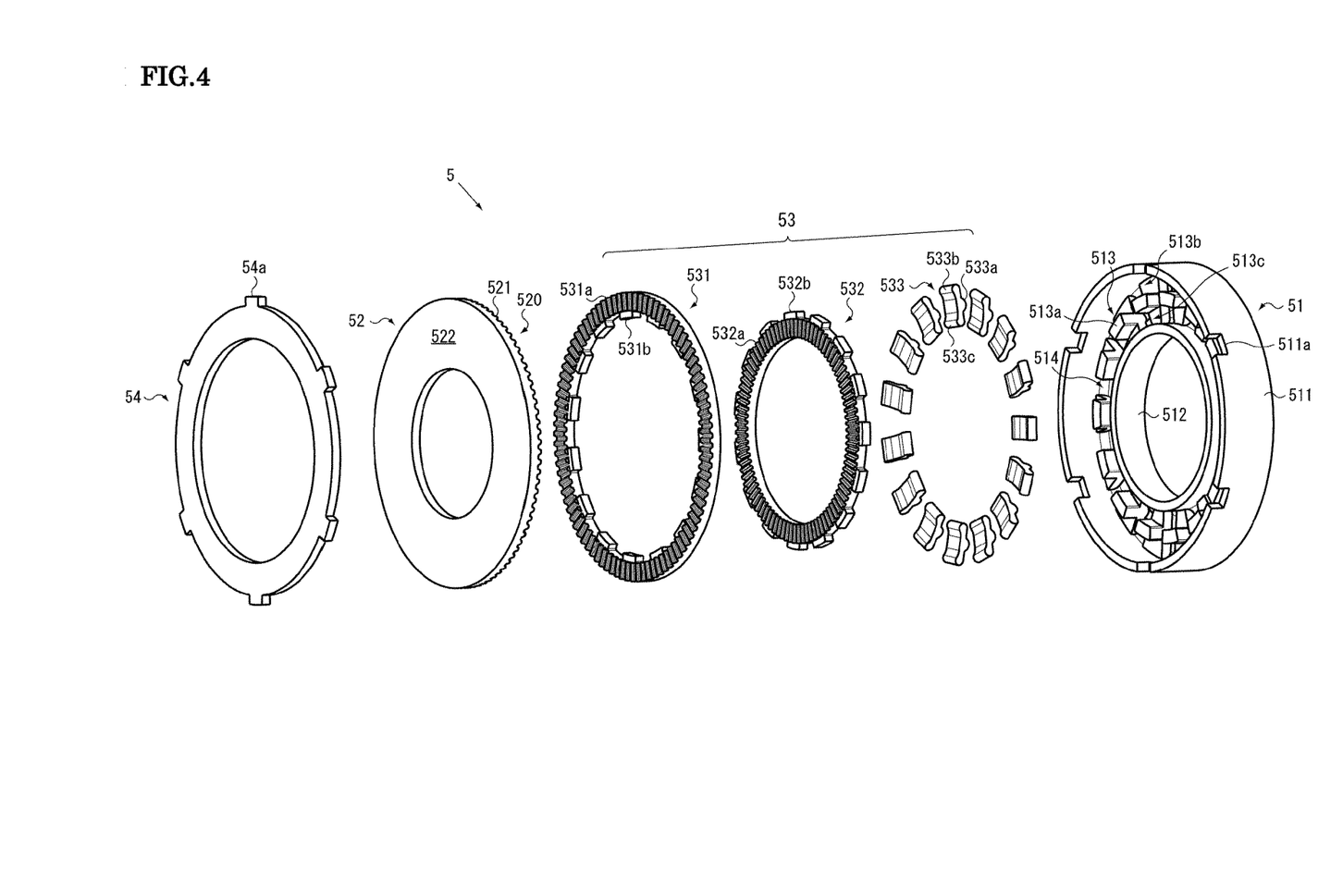
FIG. 4 is a component assembly diagram of an energy absorption device illustrated in FIG. 3.
Figure 5:
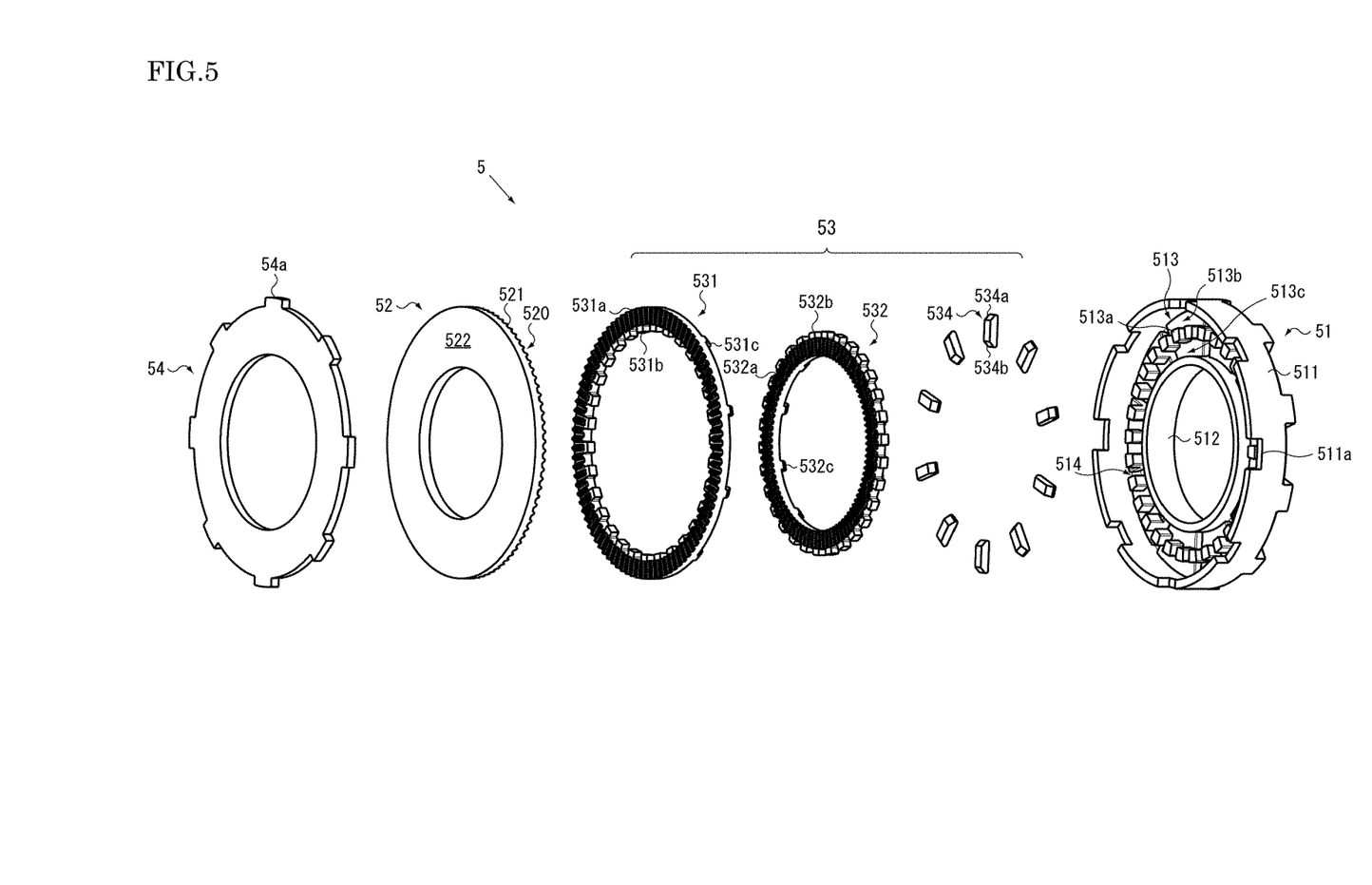
FIG. 5 is a component assembly diagram illustrating a modification of the energy absorption device.
Figure 6:
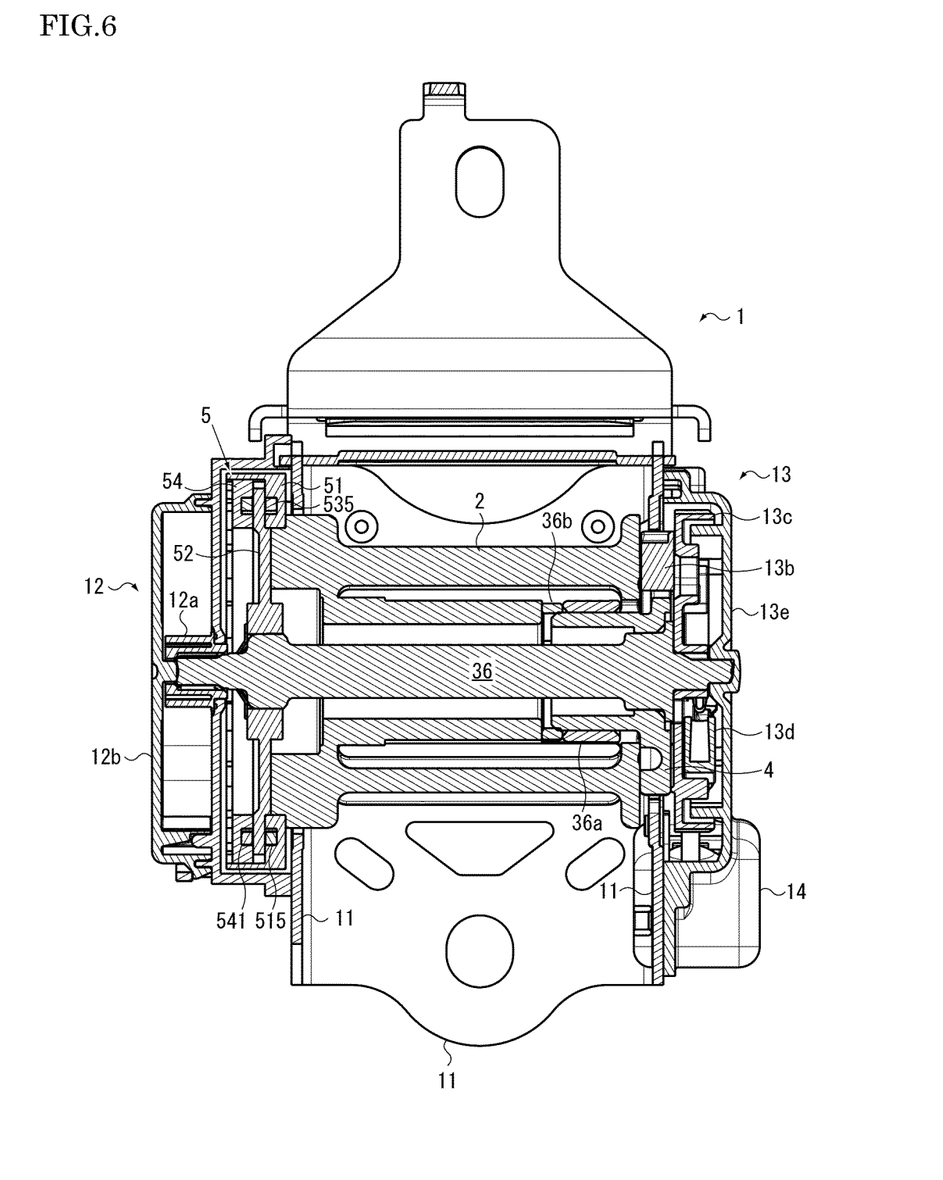
FIG. 6 is a sectional view illustrating a seat belt retractor according to a third embodiment of the present invention.
Figure 7:
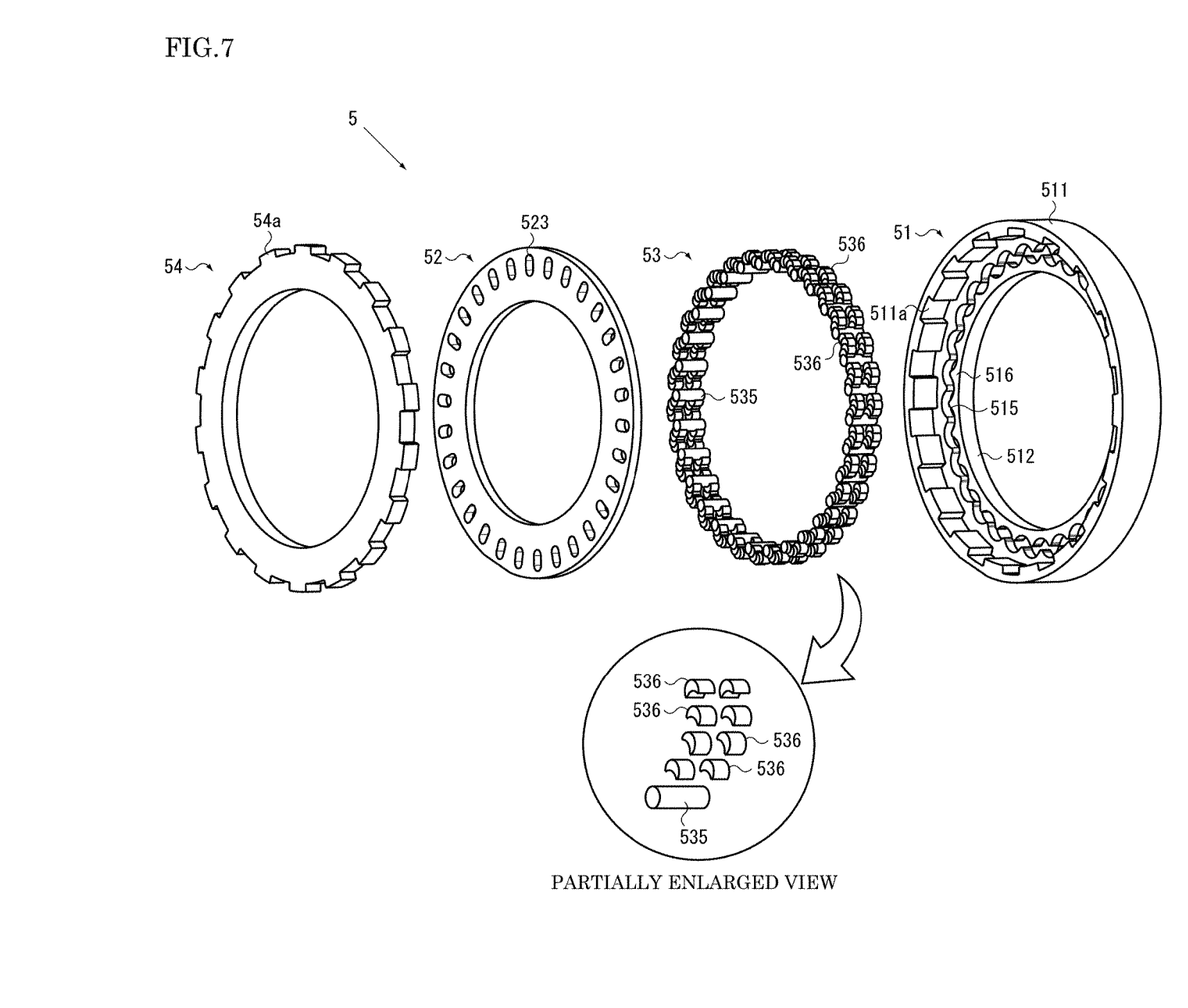
FIG. 7 is a component assembly diagram of an energy absorption device illustrated in FIG. 6.

Next, a specific structure of the seat belt retractor 1 according to the above-described embodiment is described with reference to FIGS. 3 to 7. Here, FIG. 3 is a sectional view illustrating a seat belt retractor according to a second embodiment of the present invention. FIG. 4 is a component assembly diagram of an energy absorption device illustrated in FIG. 3. FIG. 5 is a component assembly diagram illustrating a modification of the energy absorption device. FIG. 6 is a sectional view illustrating a seat belt retractor according to a third embodiment of the present invention. FIG. 7 is a component assembly diagram of an energy absorption device illustrated in FIG. 6. Note that a constituent component that is the same as the seat belt retractor 1 according to the above-described first embodiment is denoted by the same reference numeral and a duplicated description therefor is omitted.

As illustrated in FIG. 3, a seat belt retractor 1 according to the second embodiment of the present invention includes a spool 2 that performs winding of a webbing W for restraining an occupant, a torsion bar 36 inserted through an axial center of the spool 2, and a locking base 4 connected to the torsion bar 36 and capable of switching between a rotating state and a non-rotating state. The seat belt retractor 1 also includes an energy absorption device 5 capable of changing an energy absorption amount according to a relative rotation speed between the spool 2 and the torsion bar 36. The spool 2, the energy absorption device 5, the torsion bar 36, and the locking base 4 are serially connected in this order. Furthermore, the energy absorption device 5 is provided with a housing 51 coaxially disposed on a spool 2 side, a clutch plate 52 coaxially disposed on a torsion bar 36 (shaft) side, and a drag generation member 53 housed inside the housing 51 and generating drag according to a relative rotation speed between the housing 51 and the clutch plate 52. Note that illustration of the webbing W is omitted in FIG. 3 for convenience of description.

In the same way as a conventional seat belt retractor, the illustrated seat belt retractor 1 includes a U-shaped base frame 11 having a square section and rotatably housing the spool 2, a spring unit 12 disposed to one end of the torsion bar 36, a locking mechanism 13 disposed to the other end of the torsion bar 36, and an acceleration sensor 14 for detecting acceleration of a vehicle. Note that illustration of a pretensioner, which instantaneously winds up the webbing W at a time of a vehicle crash and the like to eliminate a space between the occupant and the webbing W, is omitted in the drawing; however, the seat belt retractor 1 according to this embodiment may or may not have the pretensioner.

The spring unit 12 includes a spring core 12a that forms an axial center of a spiral spring (not illustrated), and a spring cover 12b that houses the spiral spring. The spring core 12a is connected to one end of the torsion bar 36.

The locking mechanism 13 includes the locking base 4 disposed to an end portion of the torsion bar 36, a pawl 13b swingably disposed to the locking base 4, a locking gear 13c disposed to the end portion of the torsion bar 36 so as to be adjacent to an outer side of the locking base 4, a flywheel 13d swingably disposed to the locking gear 13c, and a retainer 13e that houses these components and rotatably supports the torsion bar 36.

The acceleration sensor 14 has a protrusion disposed adjacent to the locking mechanism 13 and capable of being engaged with a tooth formed on an outer periphery of the locking gear 13c upon detection of acceleration caused to the vehicle due to a vehicle crash and the like.

When detecting the acceleration caused to the vehicle due to the vehicle crash and the like, the acceleration sensor 14 suppresses rotation of the locking gear 13c, and the flywheel 13d swings accompanying this. The flywheel 13d is configured such that the pawl 13b maybe swung accompanying swinging thereof. The pawl 13b that has been swung projects in a direction of an outer diameter of the locking base 4 and engages with a tooth formed in an opening of the base frame 11. By the pawl 13b engaging, the locking base 4 is fixed to the base frame 11.

In a state where the locking mechanism 13 operates, when the webbing W is drawn out and a load equal to or greater than a predetermined threshhold α is generated, the spool 2 connected to the webbing W makes a rotary motion relative to the locking base 4. At this time, energy generated in the webbing W is absorbed by torsion of the torsion bar 36. The torsion bar 36 may also have a stopper 36a that specifies the maximum number of torsional rotations. The stopper 36a, for example, is inserted into an outer periphery of a shaft portion of the locking base 4. By such stopper 36a, rupture of the torsion bar 36 is suppressed. A collar 36b for preventing a wobble may be disposed between the stopper 36a and the spool 2.

Note that the torsion bar 36 is integrally formed of the shaft 3 and the load adjustment member 6 according to the above-described first embodiment, and the seat belt retractor 1 according to the second embodiment has substantially the same configuration as that of the seat belt retractor 1 illustrated in FIG. 1(A).

The configuration of the above-described seat belt retractor 1 is substantially the same as, for example, a configuration of a conventional seat belt retractor described in JP 2012-30636 A and the like, whereby any further description in detail is omitted herein. The seat belt retractor 1 according to this embodiment has the energy absorption device 5 disposed between the spool 2 and the torsion bar 36 at an end potion on a spring unit 12 side as illustrated in FIGS. 1(A) to 1(C).

As illustrated in FIGS. 3 and 4, the energy absorption device 5 includes the housing 51, the clutch plate 52, and the drag generation member 53. The drag generation member 53 is constituted of, for example, an annular first clutch disk 531 disposed being capable of reciprocating in a rotation axis direction inside the housing 51, an annular second clutch disk 532 disposed to an inner side of the first clutch disk 531 and being capable of reciprocating in the rotation axis direction inside the housing 51, and a swinging member 533 that causes the first clutch disk 531 and the second clutch disk 532 to alternately reciprocate in the rotation axis direction.

The housing 51, for example, has a bottomed cylindrical shape so as to be capable of housing the first clutch disk 531 and the second clutch disk 532, each having a circular external shape. Furthermore, the housing 51 has a double cylindrical shape having a cylindrically-shaped outer wall 511 and an inner wall 512. Note, however, that the shape of the housing 51 illustrated is only an example, and as long as it is capable of housing the first clutch disk 531 and the second clutch disk 532, it is not limited to the cylindrical shape. A central part of the housing 51 (an inner diameter portion of the inner wall 512) may be hollow or solid.

The housing 51 has a plurality of partition members 513 that partitions a place to dispose the swinging member 533. The partition members 513 are radially-formed wall members connected to the outer wall 511 and the inner wall 512.

Thus, it is possible to form a plurality of projected and recessed portions alternately in a circumferential direction of the housing 51, and the swinging member 533 is housed in a recessed portion 514 formed in a space between the partition members 513.

Each of the partition members 513 has a projected portion 513a that partitions a place to dispose the first clutch disk 531 from a place to dispose the second clutch disk 532. The projected portion 513a is formed to a substantially central part of the partition member 513, which is connected to the outer wall 511 and the inner wall 512, and the partition member 513 has a substantially T-shaped cross section. Then, a housing space 513b for the first clutch disk 531 is formed outside the projected portion 513a by the partition members 513 and the outer wall 511, and a housing space 513c for the second clutch disk 532 is formed inside the projected portion 513a by the partition members 513 and the inner wall 512.

The first clutch disk 531 is an annular flat plate member housed in the housing space 513b formed by the plurality of partition members 513. The first clutch disk 531 includes an engagement external tooth 531a formed opposite to a contact surface with the partition members 513, and a locking portion 531b projecting inward in a radial direction and disposed to the space between the partition members 513. The engagement external tooth 531a is formed by forming a plurality of grooves radially on a surface of the first clutch disk 531. Once the first clutch disk 531 is housed in the housing space 513b, the locking portion 531b is disposed to a position adjacent to the projected portion 513a of the partition member 513. By the locking portion 531b being locked to the projected portion 513a, rotation of the first clutch disk 531 in a circumferential direction thereof is suppressed.

The second clutch disk 532 is an annular flat plate member housed in the housing space 513c formed by the plurality of partition members 513. The second clutch disk 532 includes an engagement internal tooth 532a formed opposite to a contact surface with the partition members 513, and a locking portion 532b projecting outward in the radial direction and disposed to the space between the partition members 513. The engagement internal tooth 532a is formed by forming a plurality of grooves radially on a surface of the second clutch disk 532. Once the second clutch disk 532 is housed in the housing space 513c, the locking portion 532b is disposed to a position adjacent to the projected portion 513a of the partition members 513. By the locking portion 532b being locked to the projected portion 513a, rotation of the second clutch disk 532 in a circumferential direction thereof is suppressed.

The clutch plate 52 is an annular flat plate member having a meshing surface 520 facing the engagement external tooth 531a of the first clutch disk 531 and the engagement internal tooth 532a of the second clutch disk 532. A plurality of grooves is radially formed on a surface of the meshing surface 520, and an engagement tooth 521 is formed of projections and recesses being formed in a circumferential direction. Note that the clutch plate 52 is not limited to an annular shape and may also be a disc shape.

The teeth (or grooves) of the engagement external tooth 531a, the engagement internal tooth 532a, and the engagement tooth 521 are formed in the same phase such that the engagement external tooth 531a of the first clutch disk 531 and the engagement internal tooth 532a of the second clutch disk 532 can mesh with the engagement tooth 521 of the clutch plate 52.

The clutch plate 52 is disposed inside the housing 51 so as to be rotatable relative to the housing 51. The housing 51 has a cover plate 54 that restricts movement of the clutch plate 52 in the rotation axis direction. The cover plate 54, for example, is an annular member capable of being housed in the housing 51 and having a plurality of protrusions 54a in an outer circumferential portion thereof. Cut outs 511a, into which the protrusions 54a of the cover plate 54 can be inserted, are formed in an edge portion of the outer wall 511 of the housing 51.

It is preferred that a surface opposite to the meshing surface 520 (back surface 522) of the clutch plate 52 be formed such that frictional resistance is reduced relative to an inner surface of the cover plate 54, which is fixed to the housing 51. Note that a shape and a fixing method of the cover plate 54 is not limited to a configuration as illustrated; for example, the cover plate 54 may also have a disc shape, may also be a lid member that can be screwed with the housing 51, or may also have a configuration capable of being fixed to the inner wall 512.

The swinging member 533 has a substantially flat plate shape that can be housed in the recessed portion 514 of the housing 51. The swinging member 533 includes a slidable fulcrum 533a in contact with a bottom face of the housing 51, a first force point 533b that transmits power in contact with the first clutch disk 531, and a second force point 533c that transmits power in contact with the second clutch disk 532. The fulcrum 533a may have a shaft-like projecting shape or a sphere-like projecting shape. In the bottom face of the housing 51 facing the fulcrum 533a, a recessed portion that supports the fulcrum 533a may be formed.

Each of the first force point 533b and the second force point 533c may have a part in contact with the first clutch disk 531 or the second clutch disk 532 that is formed into a projected curved portion. By using such configuration, it is possible to reduce stress caused by contact between the swinging member 533 and the first clutch disk 531 or the second clutch disk 532.

The fulcrum 533a, the first force point 533b, and the second force point 533c are in contact with the housing 51, the first clutch disk 531, and the second clutch disk 532, respectively, whereby during reciprocation of the first clutch disk 531 and the second clutch disk 532, it is possible to apply a substantially-equal load to an entire circumference, suppress generation of stress concentration, and suppress damage of the engagement tooth 521, the engagement external tooth 531a, and the engagement internal tooth 532a.

In a state where the above-described components are assembled, in a case where the second force point 533c of the swinging member 533 is tilted so as to contact the bottom face of the housing 51, the first force point 533b is in a state of being tilted in a direction of nearing the clutch plate 52. At this time, it is configured such that the engagement external tooth 531a of the first clutch disk 531 meshes with the engagement tooth 521 of the clutch plate 52.

Similarly, although not-illustrated, in a case where the first force point 533b of the swinging member 533 is tilted so as to contact the bottom face of the housing 51, the second force point 533c is in a state of being tilted in a direction of nearing the clutch plate 52. At this time, it is configured such that the engagement internal tooth 532a of the second clutch disk 532 meshes with the engagement tooth 521 of the clutch plate 52.

According to such energy absorption device 5, as the relative rotation speed between the clutch plate 52 and the housing 51 increases, a speed of reciprocation (swinging speed) of the first clutch disk 531 and the second clutch disk 532 also increases accompanying this, whereby kinetic energy of the first clutch disk 531 and the second clutch disk 532 ($E=1/2 \cdot mv^2$) also increases.

Thus, a vertical drag N of the first clutch disk 531 and the second clutch disk 532 contacting the clutch plate 52 increases, and friction force ($F=\mu N$) generated between the engagement external tooth 531a or the engagement internal tooth 532a and the engagement tooth 521 becomes large. The friction force generated with a wall surface of the housing 51 by the reciprocation of the first clutch disk 531 and the second clutch disk 532 also becomes large. That is, it is possible to generate the drag according to the relative rotation speed between the housing 51 and the clutch plate 52 by the drag generation member 53.

Here, as illustrated in FIG. 3, the housing 51 is connected to the spool 2, and the clutch plate 52 is connected to the torsion bar 36. Thus, when the relative rotary motion is generated between the torsion bar 36 (correspondent to the shaft 3) and the spool 2, it is possible to generate the drag according to the relative rotation speed by the above-described drag generation member 53 and to absorb energy thereof accordingly. Note that in a case where the relative rotation speed is increased and the load generated in the torsion bar 36 is equal to or greater than the threshold a, the torsion bar 36 generates torsion and operates as the load adjustment member 6.

The configuration of above-described drag generation member 53 is not limited to the one illustrated in FIG. 4, but maybe the one illustrated in FIG. 5, for example. A modification illustrated in FIG. 5 uses a linear motion member 534 in place of the swinging member 533 as the drag generation member 53.

The housing 51 has a plurality of partition members 513 that partitions a place to dispose the linear motion member 534. For example, as illustrated, in a case where ten linear motion members 534 are disposed, at least ten recessed portions 514 are formed. Note that it is also possible to form many recessed portions 514 in the housing 51 in advance so as to make the number of linear motion members 534 changeable according to magnitude of energy to be absorbed.

Each of the partition members 513 has the projected portion 513a that partitions the housing space 513b for the first clutch disk 531 and the housing space 513c for the second clutch disk 532. As illustrated, it is also possible to form a plurality of projected portions 513a for one partition member 513.

The first clutch disk 531 includes the engagement external tooth 531a formed on a side of a contact surface with the clutch plate 52, the locking portion 531b projecting inward in a radial direction and disposed to a space between the projected portions 513a of the partition member 513, and a projected portion 531c formed on a side of a contact surface with the partition member 513. The projected portion 531c is formed at a position such that it can be inserted into the recessed portion 514 formed in the housing 51. Note that the projected portion 531c has a tapered surface (not illustrated) formed so as to be slidable with the linear motion member 534.

The second clutch disk 532 includes: the engagement internal tooth 532a formed on a side of a contact surface with the clutch plate 52; the locking portion 532b projecting inward in a radial direction and disposed to a space between the projected portions 513a of the partition member 513; and a projected portion 532c formed on a side of a contact surface with the partition member 513. The projected portion 532c is formed at a position such that it can be inserted into the recessed portion 514 formed in the housing 51. Note that the projected portion 532c has a tapered surface (not illustrated) formed so as to be slidable with the linear motion member 534.

The linear motion member 534 has a thin-plate block shape capable of being housed in the recessed portions 514 of the housing 51 and has tapered surfaces 534a and 534b formed at both ends in a moving direction. The tapered surface 534a is formed on an outer side in a radial direction of the linear motion member 534 so as to be contactable with the tapered surface formed in the projected portion 531c of the first clutch disk 531. The tapered surface 534b is formed on an inner side in the radial direction of the linear motion member 534 so as to be contactable with the tapered surface formed in the projected portion 532c of the second clutch disk 532.

Thus, by the linear motion member 534 moving to the outer side in the radial direction within the recessed portion 514 of the housing 51, the tapered surface 534a comes in contact with the projected portion 531c of the first clutch disk 531 and is slid, whereby the first clutch disk 531 is pushed up toward the clutch plate 52. At this time, accompanying the movement of the linear motion member 534, the second clutch disk 532 becomes movable to a side of the partition member 513 of the housing 51.

By the linear motion member 534 moving to the inner side in the radial direction within the recessed portion 514 of the housing 51, the tapered surface 534b comes in contact with the projected portion 532c of the second clutch disk 532 and is slid, whereby the second clutch disk 532 is pushed up toward the clutch plate 52. At this time, accompanying the movement of the linear motion member 534, the first clutch disk 531 becomes movable to the side of the partition member 513 of the housing 51.

As illustrated in FIG. 6, a seat belt retractor 1 according to a third embodiment of the present invention includes an energy absorption device 5 having a configuration changed from that of the seat belt retractor 1 according to the second embodiment illustrated in FIG. 3. Thus, a constituent component that is the same as that of the seat belt retractor 1 according to the above-described second embodiment is denoted by the same reference numeral, and a duplicated description thereof is omitted herein.

The energy absorption device 5 according to the third embodiment, as illustrated in FIGS. 6 and 7, includes the housing 51 coaxially disposed on the spool 2 side, the clutch plate 52 coaxially disposed on the torsion bar 36 (shaft) side, the drag generation member 53 housed inside the housing 51 and that generates drag according to the relative rotation speed between the housing 51 and the clutch plate 52, and the cover plate 54 that restricts moving of the clutch plate 52 in the rotation axis direction.

The drag generation member 53 includes a plurality of driving pins 535 having one end thereof inserted into a corrugated groove 515 formed in the housing 51 and the other end thereof inserted into a radial groove 523 formed in the clutch plate 52, and a plurality of follower bodies 536 that is housed in the corrugated groove 515 formed in the housing 51 as well as housed in a corrugated groove 541 formed on an inner surface of the cover plate 54 and that is slid along the corrugated grooves 515 and 541 accompanying the movement of the driving pins 535.

The housing 51 has an annular flat portion 516 formed between the outer wall 511 and the inner wall 512. The corrugated groove 515 is formed in this flat portion 516. In an edge portion of the outer wall 511 of the housing 51, there are formed the cut outs 511a into which the protrusions 54a of the cover plate 54 can be inserted. The corrugated groove 515 is a groove formed so as to meander in a circumferential direction of the housing 51.

The clutch plate 52 has the plurality of radial grooves 523 formed so as to be longer in a radial direction. The number of the radial grooves 523 is the same as the number of the driving pins 535 in this embodiment; however, it is possible to adjust an energy absorption amount by adjusting the number of the driving pins 535 and the number of the follower bodies 536 corresponding to the radial grooves 523. The radial grooves 523 are formed so as to penetrate through front and back sides. A length of the radial grooves 523 in the radial direction is set to a length equal to or greater than amplitude generated when the driving pins 535 move along the corrugated groove 515. A width of the radial grooves 523 in the circumferential direction is set to a width allowing the driving pins 535 to penetrate therethrough. The radial grooves 523 are formed such that an end portion on an inner side in the radial direction faces a recessed portion of the corrugated groove 515 and an end portion on an outer side in the radial direction faces a projected portion of the corrugated groove 515.

The cover plate 54, for example, is an annular member that can be housed inside the housing 51, and the cover plate 54 has the plurality of protrusions 54a in an outer circumferential portion thereof. Although not-illustrated, on a surface adjacent to the clutch plate 52, there is formed the corrugated groove 541 having the same amplitude as that of the corrugated groove 515 and having a projected portion and a recessed portion that coincide with those of the corrugated groove 515.

Each of the driving pins 535 is a cylindrically-shaped component having both ends thereof inserted into the corrugated grooves 515 and 541, respectively, and having a middle portion thereof inserted through the radial groove 523. Each of the follower bodies 536 is a columnar body component inserted into the corrugated grooves 515 and 541. As illustrated in a partially enlarged view in FIG. 7, the follower bodies 536 have, for example, a crescent-shaped section. The follower bodies 536 are disposed in plurality so as to fill a gap between the driving pins 535.

In the energy absorption device 5 according to the above-described third embodiment, the cover plate 54 is fixed to the housing 51, and in the middle, the clutch plate 52 is supported by the driving pins 535. Thus, an assembled body of the housing 51 and the cover plate 54 is configured to be capable of making rotary motion rotating relative to the clutch plate 52.

Then, as the relative rotation speed between the housing 51 and the clutch plate 52 increases, a speed of the follower bodies 536 also increases accompanied by this, whereby kinetic energy of the clutch plate 52 is converted into inertia force of the follower bodies 536. The follower bodies 536 are pushed toward a wall surface when moving inside the corrugated grooves 515 and 541, whereby a vertical drag N generated in the follower bodies 536 increases, and friction force (F=μN) also increases. That is, it is possible to generate the drag according to the relative rotation speed between the housing 51 and the clutch plate 52 by the drag generation member 53.

Note that the energy absorption device 5 according to the above-described second and third embodiments is an exemplary energy absorption device capable of changing the energy absorption amount according to the relative rotation speed between the spool 2 and the torsion bar 36, whereby it is not to be limited to the illustrated configuration. For example, it is also possible to use an energy absorption device having the configuration described in Patent Literature 2 (JP 2014-502576 A).

Next, a seat belt device 101 provided with the above-described seat belt retractor 1 is described with reference to FIG. 8. Here, FIG. 8 is an overall configuration diagram illustrating the seat belt device according to this embodiment.

Figure 8:
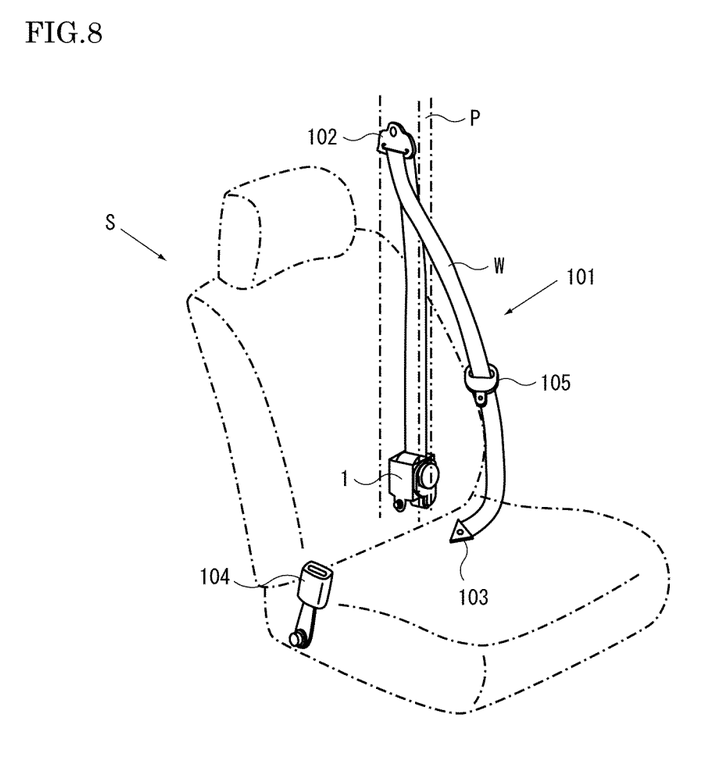
FIG. 8 is an overall configuration diagram illustrating a seat belt device according to the embodiments.

The seat belt device 101 illustrated in FIG. 8 is provided with: a webbing W that restrains an occupant (not illustrated) to a seat S; a seat belt retractor 1 that performs winding of the webbing W; a guide anchor 102 provided on a vehicle body side and that guides the webbing W; a belt anchor 103 that fixes the webbing W to the vehicle body side; a buckle 104 disposed on a lateral face of the seat S; and a tongue 105 disposed on the webbing W. The seat belt retractor 1 is any of the seat belt retractors 1 according to the above-described first to third embodiments (including the modification of the second embodiment).

The illustrated seat belt device 101 is a seat belt device for a so-called front passenger seat, and in many cases, a pillar P is disposed to a position adjacent to the seat S. Then, for example, the seat belt retractor 1 is disposed within the pillar P, and the guide anchor 102 is disposed on a surface of the pillar P. In such seat belt device 101, by pulling the webbing W out and by fitting the tongue 105 into the buckle 104, it is possible to restrain the occupant to the seat S with the webbing W.

Note that any configuration other than the seat belt retractor 1 of the seat belt device 101 is the same as a conventional seat belt device, whereby a detailed description thereof is omitted herein. The seat belt device 101 is not limited to one for the front passenger seat; it may also be a seat belt device for a driver's seat or a seat belt device for rear seats. The guide anchor 102 may be omitted in the seat belt device for the rear seats.

The present invention is not to be limited to the above-described embodiments, and needless to say, various modifications are possible within the scope not deviating from the meaning of the present invention.

The invention claimed is:

1. A seat belt retractor provided with a spool configured to perform winding of a webbing for restraining an occupant, a shaft inserted through an axial center of the spool, and a locking base connected to the shaft and capable of switching between a rotating state and a non-rotating state, the seat belt retractor comprising:
    an energy absorption device configured to be capable of changing an energy absorption amount according to a relative rotation speed between the spool and the shaft; and
    a load adjustment member configured to reduce load transmission in a case where a load equal to or greater than a threshold is applied to the shaft or the spool, wherein
    the load adjustment member is a torsion bar that is integrally formed with the shaft, wherein,
    the spool, the energy absorption device, the torsion bar, and the locking base are serially connected in this order.

2. The seat belt retractor according to claim 1, wherein the energy absorption device includes a housing coaxially disposed on a spool side, a clutch plate coaxially disposed on a shaft side, and a drag generation member housed inside the housing and configured to generate drag according to a relative rotation speed between the housing and the clutch plate.

3. A seat belt device comprising:
    a webbing configured to restrain an occupant to a seat;
    a seat belt retractor configured to perform winding of the webbing;
    a belt anchor configured to fix the webbing to a vehicle body side;
    a buckle disposed to a lateral face of the seat; and
    a tongue disposed to the webbing, wherein
    the seat belt retractor is the seat belt retractor according to claim 2.

4. A seat belt device comprising:
    a webbing configured to restrain an occupant to a seat;
    a seat belt retractor configured to perform winding of the webbing;
    a belt anchor configured to fix the webbing to a vehicle body side;
    a buckle disposed to a lateral face of the seat; and
    a tongue disposed to the webbing, wherein
    the seat belt retractor is the seat belt retractor according to claim 1.

* * * * *